United States Patent [19]

Blood

[11] Patent Number: 5,319,518
[45] Date of Patent: Jun. 7, 1994

[54] SOLID/GAS DOUBLE LAYER CAPACITOR AND ELECTRICAL STORAGE DEVICE

[75] Inventor: Robert A. Blood, Naalehu, Hi.

[73] Assignee: Jonathan Cole, Naalehu, Hi. ; a part interest

[21] Appl. No.: 920,826

[22] Filed: Jul. 27, 1992

[51] Int. Cl.$^5$ .............................................. H01G 9/00
[52] U.S. Cl. .................................................... 361/502
[58] Field of Search ....................... 361/500, 502, 326; 29/25.42, 25.03; 423/446

[56] References Cited

U.S. PATENT DOCUMENTS

| | | | |
|---|---|---|---|
| 2,193,710 | 3/1940 | Burnham | 361/326 |
| 3,335,343 | 8/1967 | Moore et al. | 29/25.42 X |
| 3,562,629 | 2/1971 | Troubetzkoi | 361/326 |
| 3,652,902 | 3/1972 | Hart et al. | 361/502 |
| 3,700,975 | 10/1972 | Butherus et al. | 361/502 |
| 4,095,162 | 6/1978 | Hiddink | 361/326 |
| 5,047,899 | 9/1991 | Bruder | 361/502 |
| 5,132,105 | 7/1992 | Remo | 423/446 |

OTHER PUBLICATIONS

1991 Proceedings of An International Seminar on Double Layer Capacitors and Similar Energy Storage Devices, organized by Dr. S. P. Wolsky and Dr. N. Marincic.

1992 Proceedings of The Second International Seminar on Double Layer Capacitors and Similar Energy Storage Devices, organized by Dr. S. P. Wolsky and Dr. N. Marincic.

Primary Examiner—Bruce A. Reynolds
Assistant Examiner—Michael D. Switzer
Attorney, Agent, or Firm—Christie, Parker & Hale

[57] ABSTRACT

A double layer capacitor comprising a conductive solid in contact with a gas, preferably an inert gas, to form a double layer capacitor of unusually high specific energy density (energy to weight ratio). The device may be sized for use with microelectronics or scaled up for use in electrical utility storage and may be controlled to provide variable conductance as an active element.

13 Claims, 4 Drawing Sheets

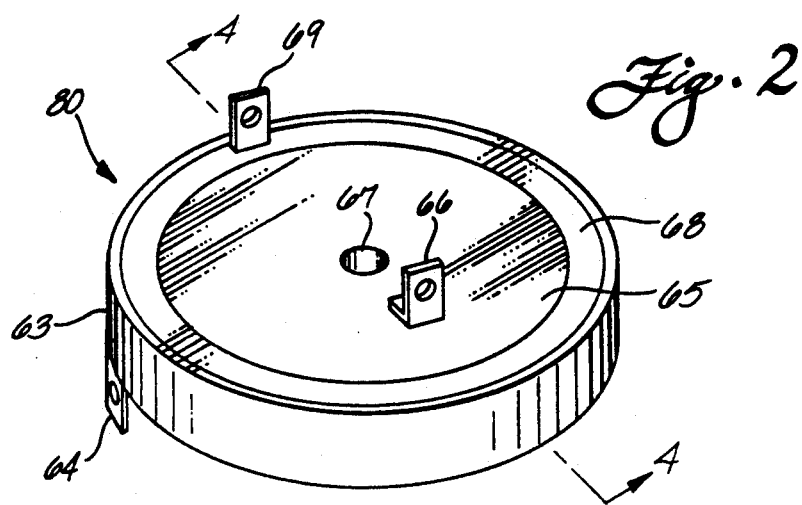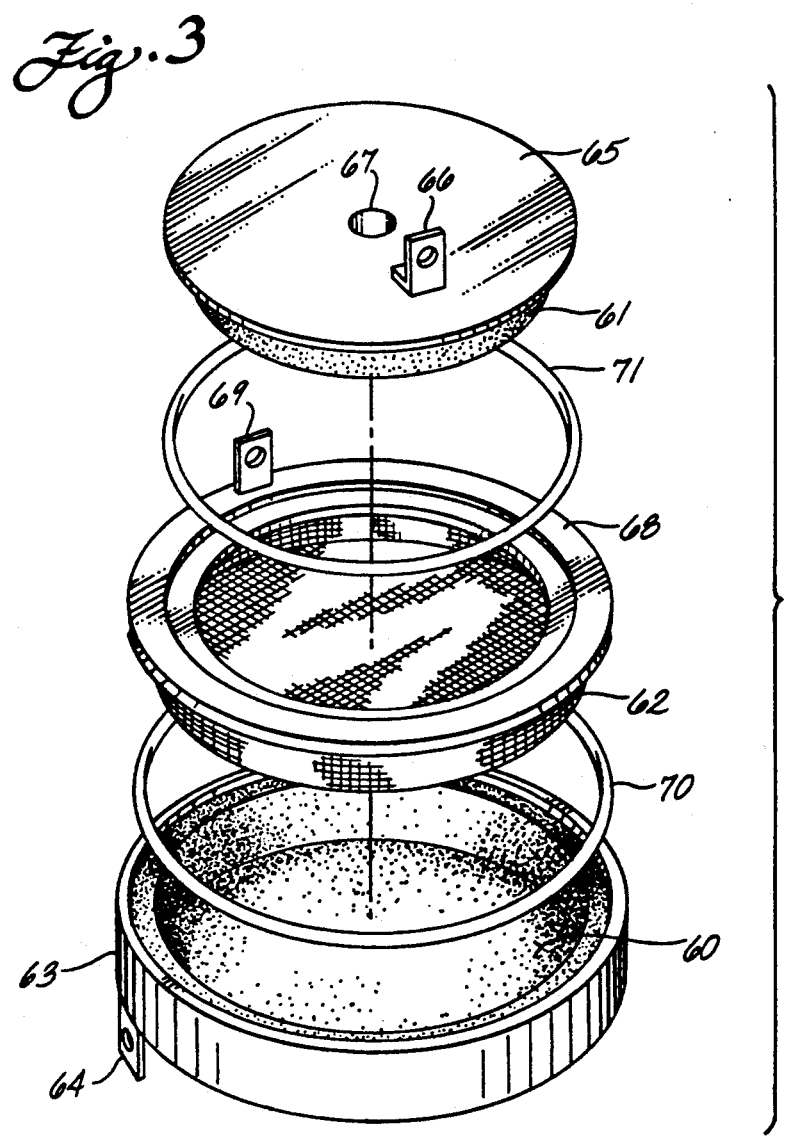

SOLID/GAS DOUBLE LAYER CAPACITOR AND ELECTRICAL STORAGE DEVICE

This invention relates to double layer capacitors, and, more particularly, to the use of a conductive solid in contact with a gas, preferably an inert gas, to form a double layer capacitor of unusually high specific energy density (energy to weight ratio). The device may be sized for use with microelectronics or scaled up for use in electrical utility storage and may be controlled to provide variable conductance as an active element.

BACKGROUND OF THE INVENTION

Double layer capacitors employing conductive solid and liquid electrolytes operate on a different principle from that employed in double-plate electrolytic capacitors. In these capacitors, a double layer of electrical charge occurs at the interface of the conducting solid and the liquid electrolyte. Typically, the conducting solid is immersed in a liquid electrolyte, such as a dilute sulfuric acid. A layer several atoms thick just inside the surface of the conducting solid constitutes one electrode of the capacitor, while the second electrode is a "virtual" electrode within the electrolyte. At the interface, a space of 1 to 2 Angstroms outside of the solid electrode contains the virtual electrode. A polarized layer of solvent molecules is attracted to the electric field of the electron layer. Outside the polarized (dipole) layer is a second charged area which contains ion particles in a diffuse layer extending about 25 Angstroms into the solvent bulk. Commercial double layer capacitors include two conductors separated by the liquid electrolyte and an ion permeable separator and are bipolar devices. The charge held in the capacitor is discharged through a load, using the ions in the electrolyte to complete the circuit between the virtual electrodes of the bipolar device. Without this ion-charged transfer path, the energy at the virtual electrodes would be inaccessible.

High capacitance is obtained in these devices by using activated charcoal for the solid electrode. The activated charcoal is a highly porous substance that has a very large surface area. For example, one gram of activated charcoal may have a surface area of 1,000 to 2,000 square meters.

Double layer capacitors, unlike batteries, can be cycled indefinitely and have at least a 10 year life. Further, these devices can easily be soldered into place, usually do not leak or explode, and easily indicate their charge. Further, they do not exhibit the undesired memory effect that is common to batteries such as Ni-Cd batteries.

Additionally, double layer capacitors can be operated over a wider temperature range than batteries. For example, these capacitors can be operated over a range from $-25°$ C. to $+70°$ C. and can be stored over a range from $-40°$ C. to $+85°$ C.

One drawback of the double layer capacitors employing a conducting solid and a liquid electrolyte, however, is the working voltage of such capacitors. The sulfuric acid solution commonly used in the commercially available double layer capacitors will decompose into hydrogen and oxygen with an electrical charge in excess of approximately 1.2 volts. Consequently, such a single double layer capacitor element has a maximum working voltage of only 1.2 volts. Should this working voltage be exceeded, there will be a chemical disassociation which can damage the device. With such a low working voltage, the double layer capacitor has limitations in applications.

To increase the voltage, such capacitors must be connected in series. However, such a connection has two drawbacks. First, the total capacitance decreases when connecting capacitors in series, and, further, the resistance increases which reduces the current handling capabilities by causing power dissipation or losses in both the charging and discharging modes. In production double layer capacitors, as many as six capacitive cells having 6 Farads of capacitance each are connected in series. This reduces the combined 36 farads of capacitance of the 6 cells to one farad, while raising resistance by a factor of six to create an acceptable working voltage for the higher voltage application.

SUMMARY OF THE INVENTION

The low voltage limitation of solid/liquid double layer capacitors can be overcome by using gas in place of the liquid electrolyte. An inert gas energized to create plasma or near plasma states is the equivalent of an electrolyte in that it has ionic nature and the ability to carry current, as well as being polarizable. The inert gas of helium has an ionization potential of approximately $24\frac{1}{2}$ volts so that the double layer form capacitor using helium as the gas would have a voltage across it of approximately $24\frac{1}{2}$ volts. A solid/gas system has a low resistance to ionic conduction and, consequently, has a higher dynamic efficiency than does the solid/liquid devices. Because of the high ionization voltage, which is higher than the breakdown voltage of solid/liquid double layer capacitors, the solid/gas devices can store more energy. The energy in a capacitor is proportional to the square of the voltage ($E=\frac{1}{2}CV^2$).

Another advantage the solid/gas double layer capacitor has over the solid/liquid double layer capacitor is that the polarized inert gas atoms are more mobile and have less complex symmetries than the permanent water dipoles which form the polarized layer in the production solid/liquid double layer capacitors. As a consequence, there is better dipole packing and greater specific energy density in the solid/gas device. Further, in the solid/liquid device, the electric field of the solid electrode induces a torque on the non-symmetrical permanent dipole of the solvent molecules which results in energy lost by thermal emission.

A particularly advantageous solid/gas double layer device consists of two double layer capacitor cells operating in series as a bipolar device. The discharge of such a bipolar device is initiated by ionizing the gas either by use of a grid placed in the gas, or by use of some other means, such as a magnetic field to cause ionization of the gas. By using a grid made of conducting material, an ionization voltage may be applied to cause conduction across the virtual electrodes of the capacitive element. Advantageously, the solid/gas bipolar device may be controlled when connected in a circuit to act as a switch either by applying a voltage having a reverse polarity to the grid, if present, to prevent ionization, or by other means to prevent ionization of the gas.

Additionally, by putting the grid into varying energetic states by means of potential variations or frequency, different ionization states can be created which affect total capacitance, resistance across the device, and the thickness of the electron layer, the dipole layer, and the diffuse ion layer. The variation of spacing between the elements and/or variations of the gas pressure result in similar variability in these same parameters of capacitance, resistance, thickness of electron layer, thickness of dipole layer, and thickness of diffuse ion layer.

BRIEF DESCRIPTION OF THE DRAWINGS

FIG. 2 is a perspective view of one embodiment of a physical solid/gas double layer capacitor in accordance with this invention.

FIG. 3 is an exploded view of the capacitor of FIG. 2 showing the components thereof.

DETAILED DESCRIPTION OF THE INVENTION

Figure 1:
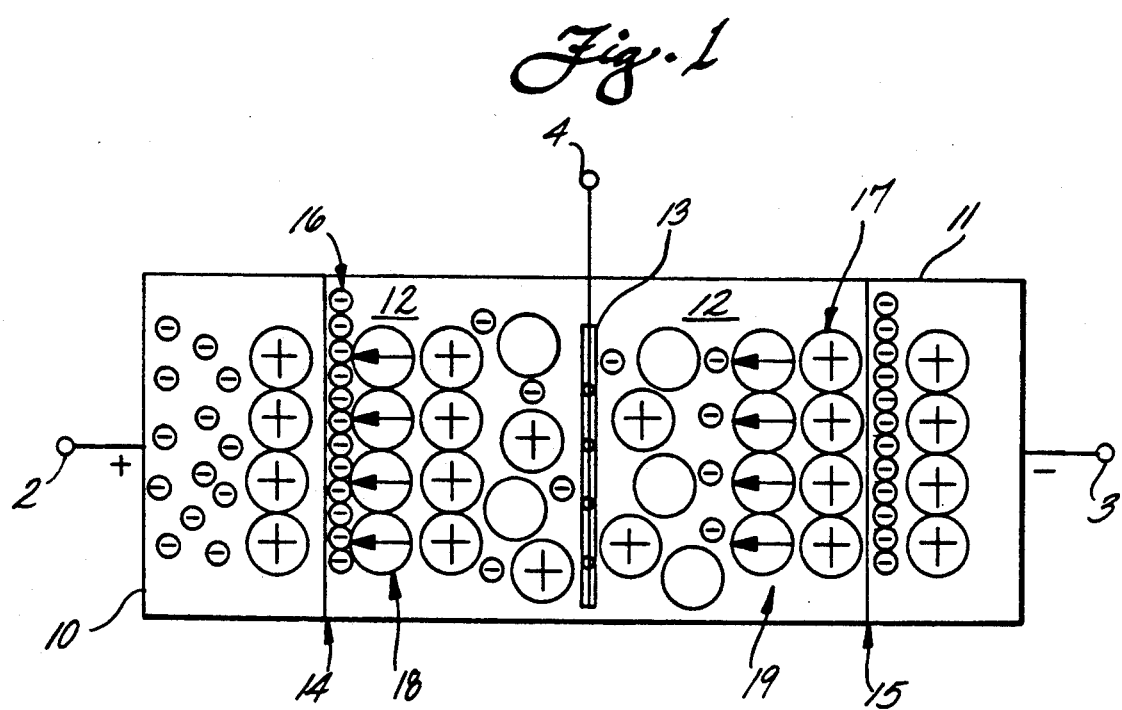
FIG. 1 is a model or diagrammatic representation of a solid/gas double layer capacitor used to describe this invention and is shown as two cells in series to form a bipolar device.

Double layer capacitors may be constructed in configurations of two or more elements or cells. A model or diagrammatic representation for purposes of explanation of a two cell, or bipolar, device in accordance with this invention is shown in FIG. 1. Each cell consists of a conducting solid in contact with a gas wherein the electrical double layer occurs at the interface of the conducting solid and the gas.

The bipolar device of FIG 1 includes a first conducting solid 10 (the anode); a second conducting solid 11 (the cathode); and a gas 12 that fills the space between the conducting solids 10 and 11, except for the space occupied by a grid 13. A positive terminal 2 is connected to anode 10, a negative terminal 3 is connected to cathode 11, and a control terminal 4 is connected to the grid 13. A first electrical double layer occurs at the interface 14 of the conducting solid 10 and the gas 12. A second electrical double layer occurs at the interface 15 between the conducting solid 11 and gas 12. The charged layers are oppositely charged.

At the zero point charge, a conductive solid can be described as a lattice of positive ion cores in a cloud of free conduction electrons. The properties of these electrons, as a quantum mechanical system, exhibit a particle wave duality. As an electromagnetic wave, the electrons exhibit optical properties as they impinge on the inner surface of the solid. Those approaching the inner surface within certain angles of incidence and kinetic energies will pass through the boundary layer to form an electrostatic cloud of charge within a layer approximately two Angstroms thick. As a consequence, the electron layer (with its associated electric field), the dipole layer, and the diffuse layer are established. When an external charge voltage is applied, the polarity of the boundary layers is either augmented or reversed and the anode and cathode of the device are established.

The resultant charged layer, represented in FIG. 1 by a row of electrons 16 near interface 14 and a row of positive ions 17 near interface 15, has an associated electric field with a defined directional polarity. Each field induces a dipole in the non-polar atoms which are nearby. In particular, charged layer (electrons) 16 has a dipole layer 18, and charged layer (positive ions) 17 has a dipole layer 19, both representatively shown in FIG. 1. Outside the polarized (dipole) layers is a second charged area which contains ion particles (associated with the anode) or electrons (associated with the cathode) in a diffuse layer extending several Angstroms into the gas. The polarization at the boundary layer reduces the strength of the electric field, allowing more charge to be added to the layer. This process continues during the charging of the layer, until some break point is reached. In the case of a solid/gas based device, the limits are the tendency of the gas to chemically combine with the solid, and the ionization breakdown potential of the gas.

The limitation of chemical combination may be eliminated by employing an inert gas for the gas in the solid/gas device. The ionization potential for the noble gases is set forth in Table 1. Also set forth in Table 1 is the polarizability of each of the inert noble gases.

TABLE 1

| | INERT GAS PROPERTIES | | | | |
|---|---|---|---|---|---|
| | He | Ne | Ar | Kr | X |
| Polarizability | 0.5 | 1.0 | 4.2 | 6.3 | 10.0 |
| Ionization Voltage | 24.6 | 21.6 | 15.8 | 14.0 | 12.1 |

The selection of the gas to be employed is a trade-off between the polarizability and the ionization voltage. The polarizability affects the chargability of the device. An atom has properties analogous to a mechanical spring. A non-polar atom, in its lowest energy state, has a positive center of charge (a nucleus) concentric with the negative center of charge (the electron layers) resulting in zero net charge. When such an atom is close enough to an electric field, the centers of positive and negative charge become offset in relation to each other, resulting in a polarization of the atom. Such a polarized atom results in an electric dipole exhibiting a bound charge. Since this stresses the quantum spacing of electron layers within the atom, energy is stored, just as in a spring. The more electron layers an atom has, the more polarizability it exhibits. When the electric field creating this tension, i.e. the polarization, becomes strong enough, it forces an electron off the atom (ionization), resulting in a lower polarizability, but higher potential.

The grid in the bipolar device as representatively shown in FIG. 1 is useful for two purposes. The grid 13 may be used to initiate the discharge of the cell by causing ionization of the gas. Alternatively, a potential may be applied to the grid 13 of opposite polarity to the potential for ionization. This opposite potential will prevent ionization and the grid can then be controlled so that the bipolar device will act as a switched electronic device.

The initiation and control of discharge may also be accomplished by means other than a grid within the body of the capacitor. For example, the gas may be ionized and/or conduction controlled by electromagnetic radiation from a radioactive source or by a magnetic field or by a plasma beam (a confined discharge through the gas). Further, an arc discharge may be caused to occur and such discharge may be controlled by a magnetic field to cause the circumference of the discharge to be pinched. The ability to control the discharge characteristics of the solid/gas double layer capacitor is a further significant advantage over solid/liquid double layer capacitors.

Microwaves or low frequency alternating current may be used in controlling ionization and discharge. Further, the shape of the grid, if used, and the spacing of the elements affect the capacitance and the resistance of the device.

One particular embodiment of a solid/gas double layer capacitor will now be described with reference to FIGS. 2, 3, and 4. The device to be described has a construction useful in macroscopic size applications, such as electrical utility storage. It is to be noted that these devices may be scaled for many different uses from low energy microcircuit applications to high energy storage uses. Also, they may be controlled to provide variable capacitance and selected discharge characteristics. For high energy applications, the device may advantageously include electrodes of a material having a large surface area, while for low energy applications, the solid electrodes may be made of a crystalline metal.

A bipolar solid/gas double layer capacitor is shown in FIG. 2. An exploded view is shown in FIG. 3, and a cross-sectional view in FIG. 4. This capacitor consists of two solid activated carbon electrodes 60 and 61 of a composite (activated carbon-carbon-metal) material. Such composition constitutes a highly porous electrode which provides a large surface area compared to a crystalline metal electrode.

An advantageous alternative electrode contains Carbon 60 (or other Fullerene materials) as a component of the composite solid. The Fullerene material significantly increases the surface area of the solid electrode, as well as having desirable conduction properties. The increased surface area increases the capacitance.

Figure 4:
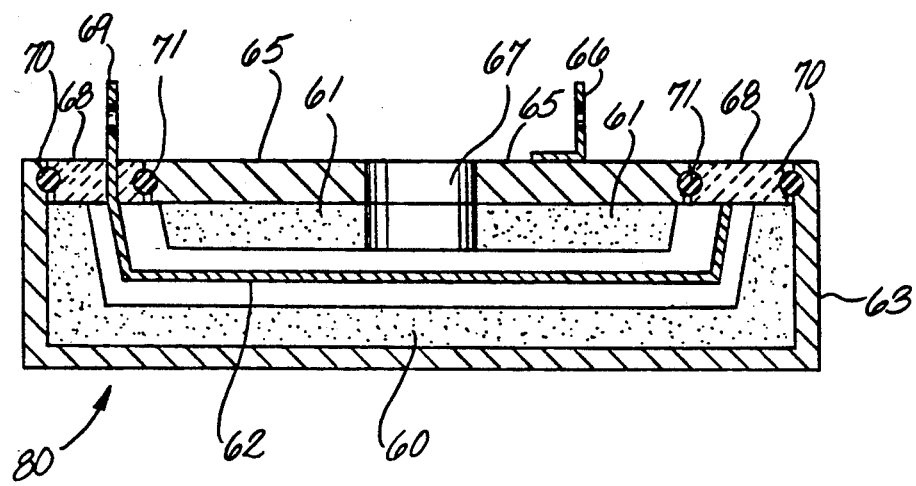
FIG. 4 is a cross-sectional view through the center of the capacitor of FIG. 2.

Since each electrode and adjacent gas in the bipolar device forms a capacitor, and since capacitance is greater per unit surface area at the anode, the anode is made smaller than the cathode in the device of FIGS. 2 through 4 in order to balance the capacitance. This is important because capacitance of the entire device decreases toward the lowest capacity value in a series configuration and capacitance is directly proportional to specific energy density.

The anode, or positive electrode, 61 is disc shaped and is nested in the cathode, or negative electrode, 60, which is cup shaped. In the space between the anode 61 and cathode 60 is a cup-shaped grid 62. The grid 62 is insulated from direct contact with the electrodes 60 and 61 by physical displacement and a ceramic ring 68. Alternatively, an ion permeable layer of insulation may separate the grid and electrodes. A gas fills the space between the cathode 60 and the anode 61. This gas is preferably an inert gas and particularly is an inert gas when Fullerenes are used as one of the materials in the electrodes.

The cathode 60 is contained in the metal cup 63 acting as a collector plate which has a negative terminal 64 attached thereto. A metal disk 65, also acting as a collector plate, is attached to the disk-shaped anode 61 and, with the ceramic ring 68 and cup 63, completes the container for the bipolar device. A positive terminal 66 is attached to the metal disk 65. Further, the metal disk 65 has an opening with a valve therein, such as opening 67, to permit the purging of the atmosphere and filling of the device with the selected gas.

The cup-shaped grid 62 in which the anode disk 61 is positioned is attached to the insulating ceramic ring 68. The cup-shaped grid 62 is made of conducting material and has a control terminal 69 connected to the grid material through the ceramic ring 68.

For solid electrodes of activated carbon, the electrodes are made by mixing the activated carbon with phenolic resin. To make the cup-shaped cathode, the mixture is placed in a container (the collector cup) having the desired dimensions and cured with heat. After cooling, the entire electrode is pyrolized at high heat. The anode is made in a similar fashion. After being pyrolized, each of the electrodes are precision machined to complete the electrode.

A non-conductive ring seal 70 is positioned between the cup 63 and the ceramic ring 68, and a nonconductive ring seal 71 is positioned between the metal disc 65 and ceramic ring 68 to create a gas tight seal for the unit.

Electrical connections to the capacitor are formed by a negative terminal 64 secured to cup 63, a positive terminal 67 secured to disk 65, and a grid terminal 69 connected to grid 62.

During assembly the components may be placed in position and a vacuum drawn in this cavity through gas valve 67. The ceramic ring 68 and disc 65 will be drawn into the cup 63 against the seals 70 and 71 to seal the unit. It will then be filled with the appropriate gas to the selected pressure.

Figure 5:
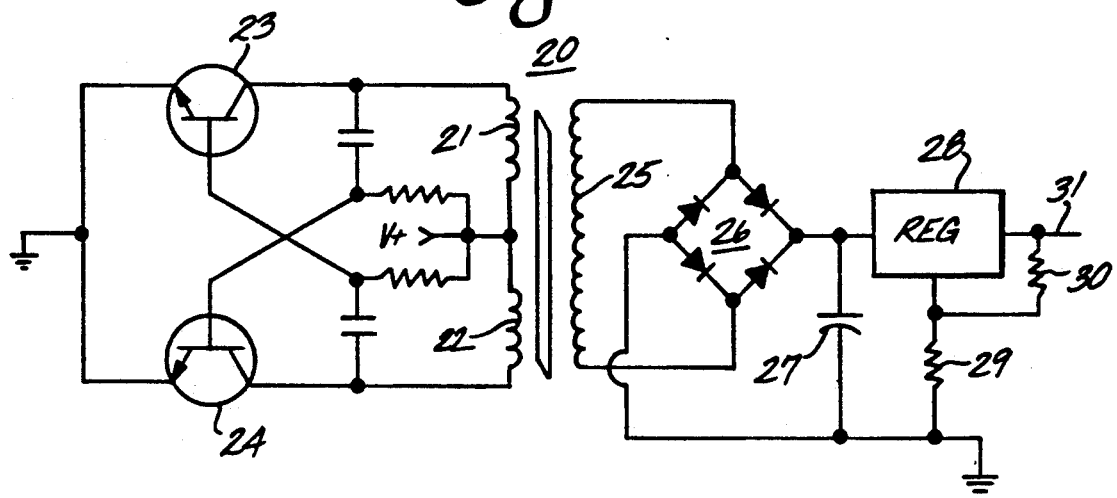
FIG. 5 is a schematic diagram of a charging circuit useful in charging solid/gas double layer capacitors.

A schematic circuit diagram for charging for initiating conduction or for regulating the discharge of a solid/gas double layer capacitor such as the one shown in FIGS. 2 through 4, is shown in FIG. 5.

The switching push-pull circuit of FIG. 5 includes a transformer 20 having a split primary winding 21 and 22 connected respectively through switching transistors 23 and 24 to ground. The positive terminal of a direct current voltage source (not shown) is connected to the center tap of the primary windings 21 and 22. This voltage may be stepped up or stepped down by the transformer 20 as required, depending upon the use of the circuit of FIG. 5. The output voltage across the secondary 25 of the transformer 20 is applied to a bridge circuit 26 for rectification. The output of the bridge circuit is filtered by capacitor 27 and a regulator 28 and resistors 29 and 30 to provide a regulated direct current voltage at output terminal 31. The circuit of FIG. 5 may be connected to the solid/gas double layer capacitor for charging. Alternatively, output terminal 31, may be connected to the grid of the solid/gas double layer capacitor for initiating conduction or preventing conduction or controlling the discharge.

Figure 6:
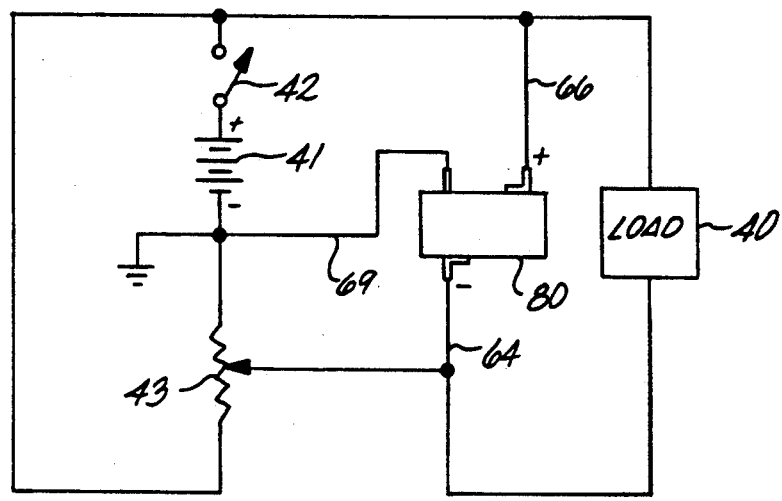
FIG. 6 is a schematic diagram of a circuitry for initiating discharge of a solid/gas double layer capacitor of this invention and for regulating the output voltage of the bipolar device.

An alternative circuit for controlling the grid voltage of a bipolar device, such as the one shown in FIGS. 2 through 4, is schematically shown in FIG. 6.

A bipolar solid/gas double layer capacitor having a positive terminal 66 and a negative terminal 4 is connected across a load 40 as shown in FIG. 6. Conduction is started in the bipolar device by applying a potential to the grid at terminal 69. The potential is supplied by a battery 41 connected between the grid control terminal 69 and the positive terminal 66 by a switch 42. The grid control terminal 69 may also be connected to ground as shown in FIG. 6.

Also connected to the grid terminal 69 is one end of a rheostat 43 with the variable connection of the rheostat being connected to the negative terminal 64 of the bipolar device 80. The other terminal of the rheostat 43 is connected to the positive terminal 68 of the bipolar device 80.

To begin discharge of the bipolar device 80 through the load 40, the gas is ionized by applying the voltage from the battery 41 by closing the switch 42. Once the ionization takes place and current begins to flow, the amount of current may be controlled by adjusting the rheostat 43. Other means of controlling the discharge may alternatively be employed.

The grid of a bipolar device may also be used as one of the conductors for the two single cells that make up the bipolar device. Such an application is shown in FIG. 7.

Figure 7:
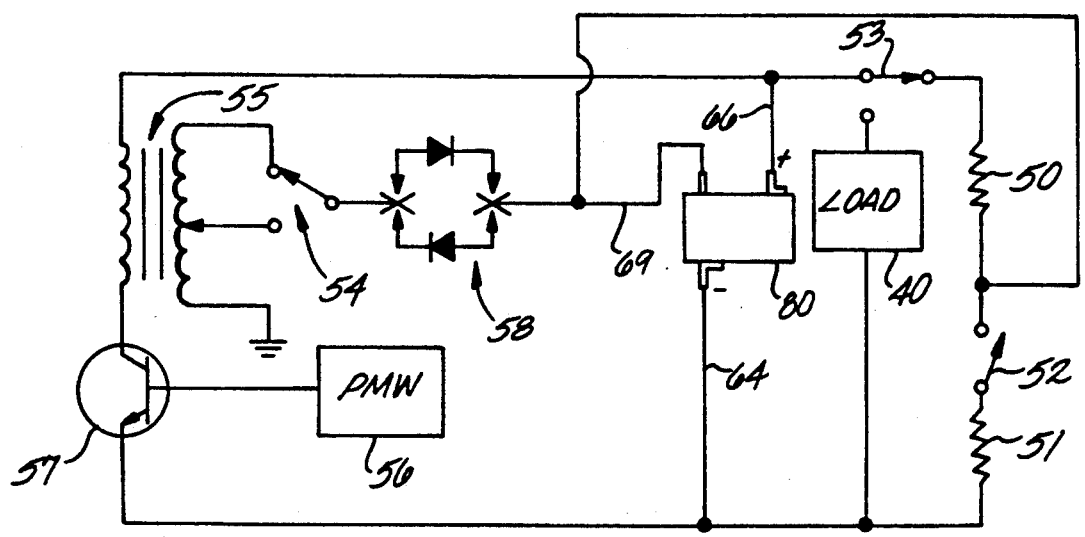
FIG. 7 is a simplified schematic diagram of a possible circuit for controlling discharge of a bipolar solid/gas double layer device.

In the schematic diagram of FIG. 7, there are three different loads that may be connected to the bipolar device 80. The first is a load 40 that is connectable directly across the entire bipolar device 80. A second load 50 may be connected across the single cell between the positive terminal 66 and the grid control terminal 69. Another load 51 may be connected between the negative terminal 64 and the grid control terminal 69 through a switch 52. Either load 40 or 50 is selected by the switch 53. Switch 53 is placed in an open condition when load 51 is selected by switch 52.

By this circuit, either the full voltage of the bipolar device 80 is applied to load 40 or something less than full voltage of the bipolar device is applied either to load 50 or load 51. Loads 50 and 51 are very low current loads compared to load 40.

Additionally, conduction through the bipolar device 80 may be initiated and controlled by using the output of the bipolar device applied through a transformer 55 under the control of a pulse width modulator 56 and transistor switch 57. The output voltage of the transformer 55 is applied to the grid control terminal 69 through a switch 54 and a rectifier circuit 58.

One particular useful application for the solid/gas double layer capacitor of this invention is to power the electric motors for an electric automobile. Electric motors have been powered by solid/liquid double layer capacitors. For example, a motor drawing 16 milliamps at a starting voltage of 5½ volts has been run for six hours by employing 16 parallel connected 3.3 Farad solid/liquid double layer capacitors. The specific energy density of solid/liquid technology is about one-fifth the specific energy density of lead-acid batteries. The much higher voltage attainable in a solid/gas double layer capacitor can result in much higher specific energy than either of these electrical energy storage devices.

Having thus described exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments as illustrated herein, but is only limited by the following claims.

What is claimed is:

1. A double layer capacitor comprising at least one solid electrode having a highly porous conductive surface and an inert gas in contact with the conductive surface of the electrode.

2. A double layer capacitor in accordance with claim 1 wherein there are two solid electrodes with highly porous conductive surfaces with the gas separating and in contact with the conductive surfaces of the electrodes.

3. A double layer capacitor in accordance with claim 2 and further comprising means for controlling the ionization of the gas.

4. A double layer capacitor in accordance with claim 3 wherein the controlling means comprises a conductive grid positioned in the gas between the two electrodes.

5. A double layer capacitor in accordance with claim 1 wherein the solid electrodes include a Fullerene material.

6. A double layer capacitor in accordance with claim 1 further comprising an active element for controlling discharge of the capacitor.

7. A double layer capacitor in accordance with claim 1 further comprising an active element for controlling the storage parameters of the capacitor.

8. A bipolar energy storage device comprising a first solid electrode having a porous conductive surface, a second solid electrode having a porous conductive surface spaced from said first solid electrode, an inert gas in the space between the electrodes and in contact with the conductive surfaces of the first and second electrodes, and means for ionizing the inert gas.

9. A device in accordance with claim 8 wherein the solid electrodes are of composite material containing activated carbon.

10. A device in accordance with claim 8 wherein each solid electrode is of a composite material and includes a Fullerene material.

11. A solid/gas double layer capacitor comprising a cup-shaped cathode, a cup-shaped container for the cathode functioning as a collector plate for the cathode, a disc shaped anode nested in the cathode and physically and electrically separated from the cathode, a disc shaped cover for the anode functioning as a collector plate for the anode, a cup shaped grid positioned between the anode and the cathode, and an inert gas filling the space between the anode and cathode except for the space occupied by the grid, at least one of the anode and cathode having a highly porous conductive surface in contact with the gas.

12. A double layer capacitive device comprising at least one electrode having a porous conductive surface, an inert gas in contact with the conductive surface of the electrode, the gas having an ionization voltage, and a voltage source coupled between the electrode and the gas to form a double layer capacitor at the interface of the conductive surface and the gas, the voltage of the voltage source being of such value as to ionize the gas between the voltage source and the electrode without exceeding the ionization voltage across the double layer capacitor.

13. A device in accordance with claim 12 wherein the porous electrode includes a Fullerene material.

* * * * *